United States Patent [19]

McCabe

[11] 4,372,485
[45] Feb. 8, 1983

[54] THERMALLY ACTIVATED, AUTOMATIC DAMPER AND DAMPER OPERATOR

[76] Inventor: Francis J. McCabe, 239 Hastings Ct., Doylestown, Pa. 18901

[21] Appl. No.: 211,914

[22] Filed: Dec. 1, 1980

[51] Int. Cl.³ .................... G05D 23/00; F23L 5/00
[52] U.S. Cl. ........................ 236/1 G; 126/285 R; 126/292; 26/296
[58] Field of Search ............. 236/1 G, 93 R, 49; 110/163; 126/285 R, 288, 289, 292, 293, 296

[56] References Cited

U.S. PATENT DOCUMENTS

| | | | |
|---|---|---|---|
| 2,148,530 | 2/1939 | Burke | 98/33 |
| 2,285,749 | 6/1942 | Stuart | 236/1 G |
| 2,493,736 | 1/1950 | Brown | 251/11 |
| 3,009,473 | 11/1961 | Hennen | 137/315 |
| 3,366,333 | 1/1968 | Diehl | 236/93 |
| 3,532,321 | 10/1970 | Bowman et al. | 251/175 |
| 3,543,439 | 12/1970 | Pantland | 49/7 |
| 3,580,238 | 5/1971 | Diehl | 126/295 |
| 3,725,972 | 4/1973 | McCabe | 16/48.5 |
| 3,796,249 | 3/1974 | McCabe | 160/1 |
| 3,889,314 | 6/1975 | McCabe | 16/48.5 |
| 3,921,900 | 11/1975 | Cole | 236/93 |
| 3,976,245 | 8/1976 | Cole | 236/93 A |
| 4,040,304 | 8/1977 | McCabe | 74/230.17 T |
| 4,041,570 | 8/1977 | McCabe | 16/48.5 |
| 4,074,388 | 2/1978 | McCabe | 16/48.5 |
| 4,080,978 | 3/1978 | McCabe | 137/79 |
| 4,099,292 | 7/1978 | McCabe | 16/48.5 |
| 4,114,805 | 9/1978 | Humphreys et al. | 236/1 G |
| 4,146,048 | 3/1979 | McCabe | 137/75 |
| 4,152,377 | 5/1979 | Takata | 261/39 B |
| 4,165,359 | 8/1979 | Thomas et al. | 422/105 |
| 4,195,384 | 4/1980 | McCabe | 16/48.5 |
| 4,200,954 | 5/1980 | McCabe | 16/48.5 |
| 4,205,706 | 6/1980 | Jasensky | 138/89 |
| 4,205,783 | 6/1980 | Dietsche et al. | 236/1 G |
| 4,213,227 | 7/1980 | McCabe | 16/48.5 |
| 4,219,041 | 8/1980 | McCabe et al. | 137/79 |
| 4,225,080 | 9/1980 | Barth | 236/1 G |
| 4,241,748 | 12/1980 | McCabe | 137/77 |
| 4,269,166 | 5/1981 | Worley et al. | 126/285 R |
| 4,289,271 | 9/1981 | Barth | 236/1 G |

FOREIGN PATENT DOCUMENTS 7520690  1/1977  France ........................ 137/75

OTHER PUBLICATIONS

TITUS Dampers for Round Neck Ceiling Diffusers-No. 139.
ETL Electro-Thermal-Link: Options and Accessories.

*Primary Examiner*—Edward G. Favors
*Attorney, Agent, or Firm*—Benasutti Associates, Ltd.

[57] ABSTRACT

For a damper, an improved damper operator including a bimetallic element connected at one end to the frame of the damper, and at the other end to a pivotal linkage which is also pivotally connected to the blade or blades of the damper.

15 Claims, 10 Drawing Figures

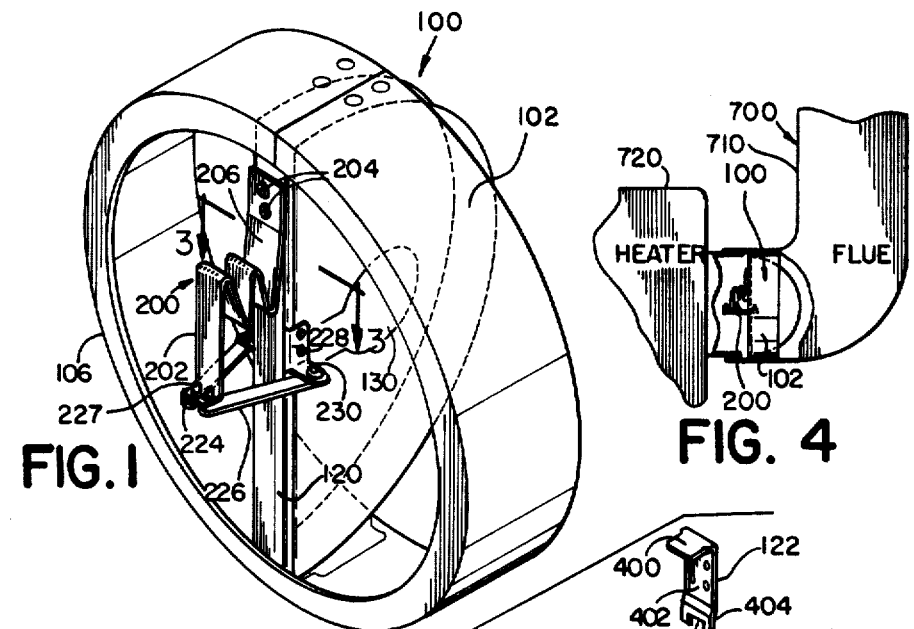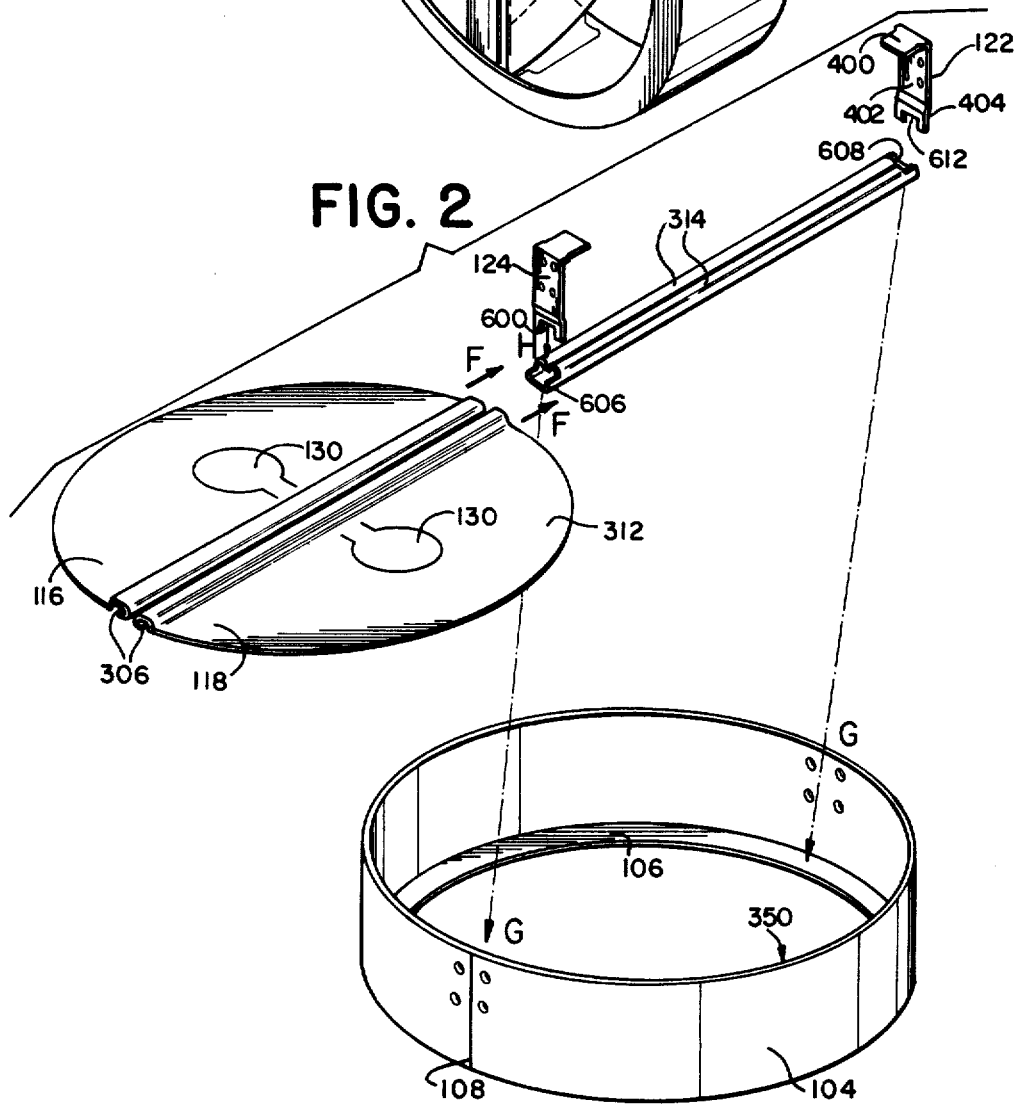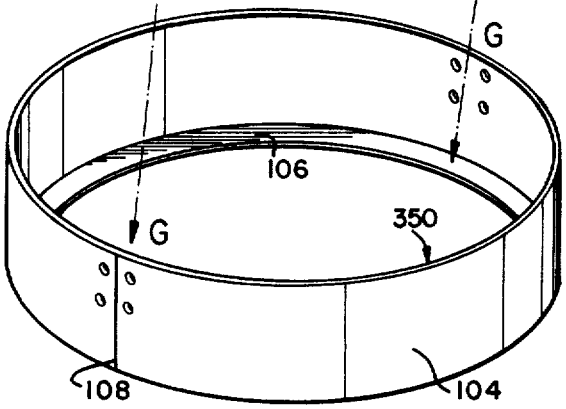

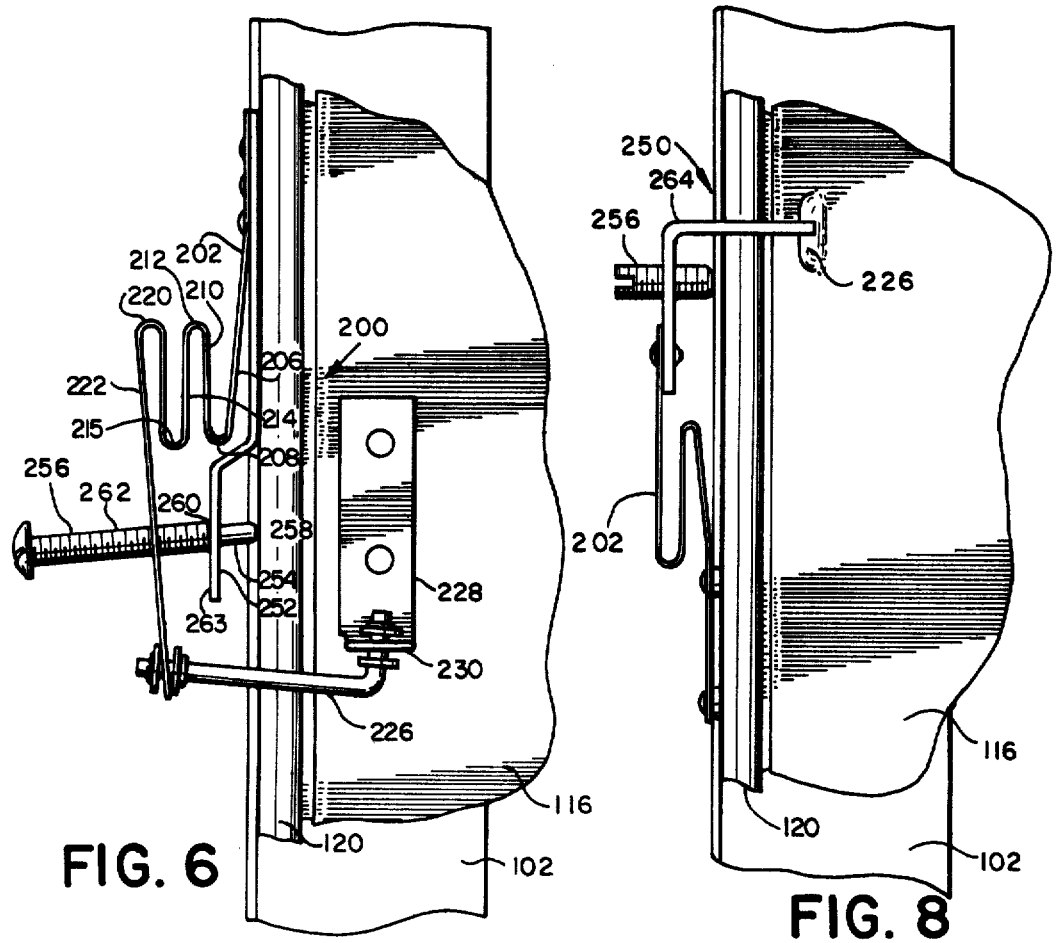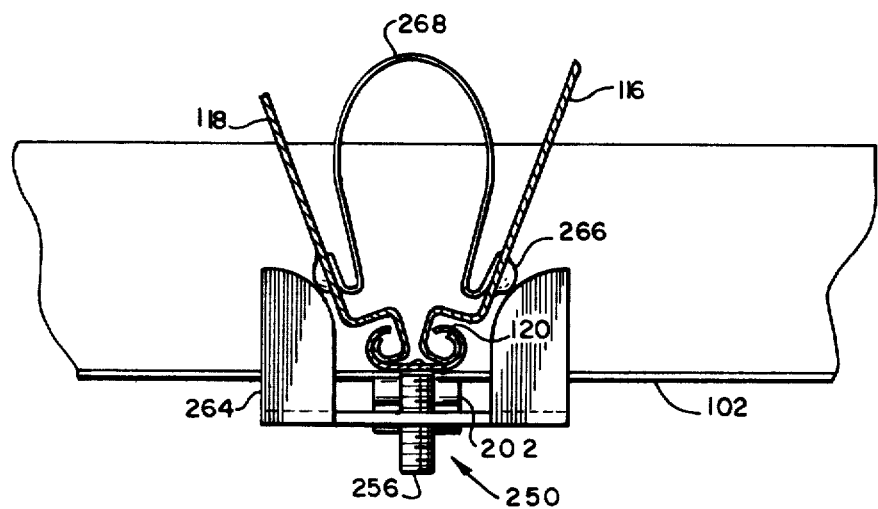

THERMALLY ACTIVATED, AUTOMATIC DAMPER AND DAMPER OPERATOR

BACKGROUND OF THE INVENTION

The present invention relates generally to dampers, and more particularly, to a thermal operator for use with such dampers.

A problem commonly encountered in conjunction with the use of many oil and gas fired home and hot water heaters, as well as wood and coal burning stoves and fireplaces, is that smoke and gases are constantly produced. These fumes must therefore be vented to the outside through a chimney or flue. This is done both to create proper draft conditions for combustion and to avoid creating conditions hazardous to the inhabitants of the building where such heating systems are being used. However, such a vent creates a permanent opening which, when the system is not being used, allows heat to escape from the structure being heated, creating the potential for considerable energy losses and, accordingly, considerable operating expenses.

In recognition of this problem, a variety of dampers have been developed which are capable of being fitted into the vent or chimney of the heating system to block this vent opening in a manner which conserves residual heat contained within the building, thus reducing the rate of fuel consumption. Essentially, such dampers generally use an external sensor to actuate the damper operator and thereby open or close the damper as needed. For example, U.S. Pat. No. 4,123,001, issued to Kolt, and U.S. Pat. No. 3,921,900, issued to Cole, both show bellows actuated systems for use with such dampers. U.S. Pat. No. 4,205,783 issued to Dietsch, discusses spring biasing means for use with a motor operated damper. However, the problems and expenses encountered in adapting such actuator systems to the damper and the associated chimney structure, as well as the cost of the power frequently required to operate such actuator systems, can be significant, often negating the savings afforded by the reduction of heat losses provided by the damper.

It is therefore preferable that the damper be self actuating, so that when placed into a vent or flue, the damper can respond directly and automatically to the presence or absence of heat or pressure to open or close. Using such a system, no external source of power would be required, providing a substantial savings in cost. Moreover, this permits such a damper to be located in places where excessive heat loads exist, which can quickly degrade electrical sensor wiring, or where external power lines are difficult or expensive to install. Further, such dampers would be easier to adapt to a wide variety of operating conditions with a minimum of alteration or modification. Such capabilities can provide significant savings, both in the initial fabrication of the damper, as well as in the field installation and ultimate use of that damper.

One approach which has been used in an effort to meet this need for a self actuating damper involves the use of a plurality of interleaved bimetallic flaps, usually four, which are capable of reciprocally folding open and closed according to the ambient temperature within the flue. However, such a device tends to suffer from a number of disadvantages. For example, each flap must be self actuating, and therefore must be fabricated from relatively expensive bimetallic materials. Moreover, such materials, while flexible to some degree, are generally unable to completely fold out of the path of exiting smoke or fumes, thus creating a chimney restriction. This, at best, reduces furnace efficiency by reducing chimney draft, and at times, can even cause smoke and gaseous combustion products to back up within the system and escape into the building. Another disadvantage of such a damper is that the flaps must be specifically sized in order for the damper to be useful in a variety of applications. This adds to the normal scrap losses encountered in producing such a damper, adding significantly to its cost of production. Lastly, bimetallic material is relatively stiff. As a result, flaps manufactured using such materials do not respond quickly. Because of this, in furnaces where an increase in pressure can occur before an increase in temperature, for example in oil fired furnaces, such flaps are unable to open quickly enough to relieve the pressure produced. It is for this reason that such damper systems are not recommended for use with oil fired furnaces.

It is therefore desirable to provide a damper having a self actuating damper operator and which can be constructed of low cost, general purpose components, yet which is readily adaptable to a wide variety of installation situations and operational conditions. Such a system would significantly reduce, if not entirely eliminate, the foregoing problems.

SUMMARY OF THE INVENTION

In accordance with the present invention, a damper is provided with a novel damper operator which obviates the foregoing problems. Although the damper operator of the present invention can be used in conjunction with a wide variety of damper constructions, its preferred use is in conjunction with butterfly-type dampers. An example of such a butterfly damper, which is primarily constructed to perform as an air, smoke and fire damper, is described in my previously issued U.S. Pat. Nos. 4,146,048, dated Mar. 27, 1979, and entitled, "FIRE DAMPER AND METHOD OF CONSTRUCTION"; and 3,889,314, dated June 17, 1975, and entitled "HEAT ACTUATED LINK". The subject matter of both of these U.S. patents is incorporated by reference as if fully set forth herein.

Basically, butterfly dampers include a pair of complementary blades which are engaged by hinge elements of a cross-bar extending across the length of the damper frame to bridge the duct in which the damper is installed. If preferred, the cross-bar may also be directly attached to opposing sides of the duct wall. In the fully open position, the blades are caused to assume a position in which they are substantially parallel to one another, and to the air flow within the duct, so that only the thin blade edges are contacted by the air flow, thus minimizing resistance to the air flow through the duct. In the fully closed position, the blades and the cross-bar combine to substantially seal the duct which has been provided with the damper. The frame, blade and cross-bar components are readily adaptable for use in varied applications.

In accordance with the present invention, the damper is provided with a self actuating damper operator mechanism which generally comprises a bimetallic, serpentine thermal spring element, one end of which is attached to the cross-bar, and the other of which is pivotally connected to the blades of the damper by a pair of links. Operation of the damper occurs when the ambient temperature surrounding the thermal spring element changes.

For example, the damper and damper operator of the present invention can be used in the capacity of a flue damper, if desired. In such case, when the thermal spring element is cooled, the damper operator is set to assume its closed position. As the element is heated, its bimetallic structure causes it to flex. This causes the attached links to rotate the blades to their open position. When the thermal spring element is cooled, the reverse effect occurs and the blades are again closed. This operation is continuous and passive, since no external sensor means or power source is needed to obtain these results.

In addition to providing a substantially improved flue damper, the damper operator of the present invention is also capable of use with other types of dampers, one example being ceiling mounted smoke/fire dampers. In such an application, the damper is generally provided to complement a fire rated secondary ceiling, to prevent heat damage to the primary ceiling and its structural support for a rated time period. For smoke dampers, the thermal spring element is caused to operate as described above, causing the blades to open when heated, to permit smoke to escape from the room, and to close when cooled. For fire dampers, operation of the thermal spring element is reversed, so that the blades close when heated and open when cooled.

Further, the damper operator of the present invention can be used to provide a control damper for use with air-conditioning systems. In this application, the damper is caused to respond to changes in room temperature, so that the conditioned air admitted to a selected area can be regulated to maintain a uniform temperature therein. However, in such an application it is generally necessary to avoid system imbalances by assuring that there is always some minimum amount of air being admitted into any given area. This is accomplished by providing the thermal spring element with a means for volume adjustment which is capable of assuring that the blades of the damper remain open a sufficient amount to assure the maintenance of a proper flow through the air duct within which the damper is placed.

Lastly, in pilot operated systems or remotely controlled systems, an additional, remote operator can be provided for use with the damper operator of the present invention to further control the opening and closing of the damper and thus, to remotely maintain stable operating conditions within the system.

Thus, the primary object of the present invention is to provide a damper having a passive, self actuating damper operator.

A further object of the present invention is to provide a damper operator capable of causing a damper to open and close in response to a selected stimulus.

A further object of the present invention is to provide an adjustment means for a damper operator which can provide a selected minimum or maximum flow rate through a damper with which it is associated.

These and other object of the present invention will become apparent from the following detailed description, taken in conjunction with the following illustrations.

BRIEF DESCRIPTION OF THE DRAWINGS

FIG. 1 is a perspective view of a damper, also showing the frame, blades and damper operator of the present invention.

FIG. 2 is an exploded view of the damper of FIG. 1.

FIG. 4 is a partial, cross-sectional view illustrating installation of the damper of FIG. 1 in an exhaust flue.

FIG. 6 is a partial, side elevational view of a damper having a damper operator which has been modified to provide air control.

FIG. 8 is a partial, side elevational view of a damper having an alternative embodiment damper operator adapted for use in air control.

FIG. 9 is a fragmentary, cross-sectional view of the damper operator shown in FIG. 8.

In the several views provided, like reference numerals denote similar structure.

DETAILED DESCRIPTION OF THE PREFERRED EMBODIMENTS

Figure 3:
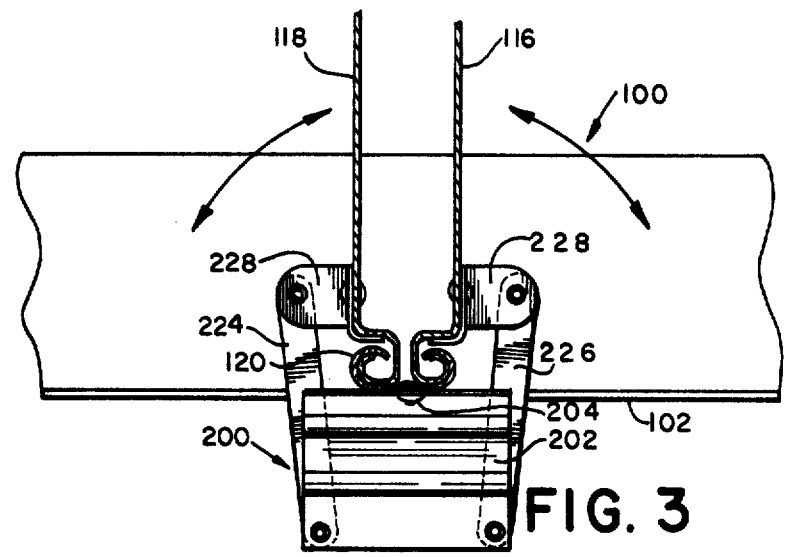
FIG. 3 is a fragmentary, cross-sectional view of the damper of FIG. 1, taken along line 3—3 in FIG. 1.

Although specific forms of the invention have been selected for illustration, and the following description is drawn in specific terms for the purposes of describing these forms of the invention, this description is not intended to limit the scope of the invention which is defined in the appended claims.

Referring now to the drawings, FIGS. 1 and 2 show a preferred embodiment butterfly damper, designated generally as 100. As shown, the damper 100 is substantially circular, having a frame 102 including a peripheral wall 104 and an inwardly depending flange 106. The wall 104 of the damper frame 102 is connected together by welding, riveting or some other means of attachment to form a substantially circular shape at the weld line 108. It is, of course, not necessary for the damper frame 102 to be circular in cross-section, it being clearly understood that similar damper frames can be formed to fit within any of a number of duct shapes, examples being those having square or rectangular cross-sections.

Extending diametrically across the assembled damper frame 102 is a cross-bar 120. The cross-bar 120 preferably lies on the flange 106 of the frame 102, being held to the frame 102 by retention brackets 122 and 124. The edges of the cross-bar 120 are fashioned to provide a pair of hinge elements 314 which are capable of engaging the blades 116, 118 of the damper in a manner which will be more fully described below.

The damper 100 also comprises a pair of substantially hemispherical blades 116, 118, each of which includes a planar face 312 which terminates in a hinged portion 306. Each of the blades 116, 118 are fastened to the crossbar 120 so that the hinged portions 306 are engaged by the hinge elements 314 of the crossbar 120. The blades 116, 118 are then capable of rotation within the damper 100, from an open to a closed position. In their open position, the blades 116, 118 are folded out of the way of the air flow, so that they are substantially parallel to each other as well as to the direction of the air flowing through the damper. In this manner, only the relatively thin edges of the blades 116, 118 are contacted by the air flow, minimizing resistance to that air flow through the damper 100. In their closed position, the blades 116, 118 are folded downwardly to rest on the flange 106 of the damper frame 102, which, in combination with the cross-bar 120, serves to substantially seal the duct in which the damper 100 is housed.

In many damper applications, it is necessary to assure that a continuous stream of combustion products can be emitted from the system, rather than being trapped in that system. This is particularly so with regard to coal and wood stoves, as well as pilot operated gas heaters and hot water heaters. In order to accommodate this need, the blades 116, 118 can be provided with knockout sections 130 which can be removed when the damper is installed, providing a continuous opening through which such combustion products are able to pass.

Referring now to FIGS. 1 and 3, the damper operator linkage 200 of the present invention may now be described. As shown, the operator linkage 200 generally comprises a serpentine shaped, bimetallic spring element 202 which is attached to the crossbar 120, and a pair of element links 226 which are pivotally mounted between a mounting flange 224 associated with the spring element 202 and a mounting bracket 228 associated with the blades 116, 118 of the damper.

The serpentine, bimetallic element 202 generally includes a base portion 206 which is attached to and extends along the crossbar 120, arching slightly away therefrom; a first bend 208 which substantially reverses the extension of the bimetallic element 202; a mid-portion 210 which extends from the first bend 208 over portions of the base portion 206; a second bend 212 and a second mid-portion 214 which extends from the mid-portion 210; a third bend 216 and a third mid-portion 218 which extends from the mid-portion 214; and lastly, a fourth bend 220 having a terminating end portion 222 which preferably diverges slightly away from the mid-portions 218, 214, 210 and the base portion 206.

It is preferred that the bends 208, 212, 216, 220 should all have as small radius as is possible, to maximize spring action. It has been found that a radius of curvature on the order of $\frac{1}{8}''$ is adequate for this purpose. However, in order to maximize performance, the bends should be made around a curved mandrel, rather than being folded over a sharp point, to provide maximum resistance to stress cracking.

At the terminating end of the portion 222, a mounting flange 224 is provided which is capable of accepting the ends of a pair of pivotal thermal element links 226 at the pivot points 227. The opposite ends of each of the links 226 are also pivotally attached, at the pivot junction 220, to a pair of mounting brackets 228 attached to each of the faces 312 of the blades 116, 118. This operatively connects the element 202 with each of the blades 116, 118.

After assembly, the damper 100 and the damper operator 200 are then ready for insertion into a chimney or duct 700, an example of one such installation being shown in FIG. 4. In this case, the installation is being used as a flue damper, the damper operator 200 being positioned within the duct 700 so that the frame 102 of the damper engages the side walls 710 of the duct 700 and so that the bimetallic spring element 202 faces the source of heat 720. Under cool conditions, the operator 200 is stretched so that the blades 116, 118 assume a position in which they substantially seal the heat source 720 from the exhaust flue 700. As the temperature increases, due to operation of the heat source 720, the bimetallic element 202 is heated. Due to the nature of the bimetallic material which comprises the element 202, this causes the element 202 to contract and tighten. As this occurs, the links 226 are pushed inwardly, causing their associated blades 116, 118 to follow. This causes the blades 116, 118 to rotate to their open position, as illustrated in FIG. 1, so that the blades 116, 118 are substantially parallel to any air flowing through the duct 700. When the source of heat is discontinued, the bimetallic element 202 cools and relaxes, which pulls on the links 226, causing the blades 116, 118 to again close.

Figure 5:
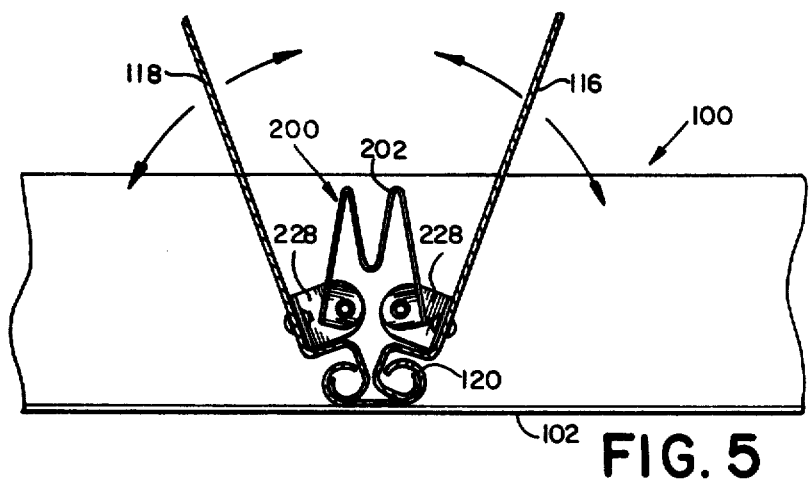
FIG. 5 is a fragmentary, cross-sectional view of a damper similar to that of FIG. 1, but having an alternative embodiment damper operator.

The bimetallic damper operator 200 of the present invention can assume a variety of alternative configurations. FIG. 5 shows one such alternative embodiment bimetallic spring 242. In this case, the bimetallic spring 242 is pivotally connected directly to brackets 228 attached to the inside surfaces of the blades 116, 118, so that expansion and contraction of the spring 242 operates directly on the blades 116, 118 to cause them to open and close. Heating and cooling the spring 242 can serve to operate the damper illustrated in FIG. 5 in substantially the same manner as previously described in conjunction with the damper of FIGS. 1 and 3. This approach has the added advantage of providing a damper having extremely low fabrication and installation costs.

Spring elements 202 and 242 are both capable of being fabricated to operate at a wide range of selected temperatures, and to do so with varied response rates. This may be done without affecting, to any significant degree, the cost of either the operator element or the damper to which it is attached. Furthermore, in the configurations shown, with proper care regarding fabrication techniques, essentially 100% of the bimetallic material can be used, holding losses due to scrap or waste to a minimum.

The foregoing describes use of the damper operator 200 of the present invention to provide the function of a flue damper; one which is to open in the presence of heat. However, the damper operator 200 of the present invention is also capable of being used to provide the function of a fire damper; one which is to close when a fire occurs. To do so, all that need be done is to reverse the orientation of the materials comprising the bimetallic spring element 202, so that when the element 202 is heated, the element 202 expands, causing the blades 116, 118 of the damper to be pulled closed; and so that when cooled, the element 202 contracts, so that the blades 116, 118 are pushed open.

Moreover, the thermal operator 200 of the present invention is not limited to reciprocation between a fully open and a fully closed position. Rather, with relatively simple modifications, it is possible to adapt the damper 100 and the damper operator 200 for use in conjunction with a variety of air handling needs in which the damper 100 must be opened or closed from some intermediate partially open position. Such a capability permits the damper 100 and the damper operator 200 to be used in conjunction with large, multi-branched air-conditioning systems, in which it is necessary to balance the system by presetting maximum or minimum air flow rates within each branch of the system, while retaining some degree of flexibility in adjusting individual air flow rates in response to changes in thermal loading in one or more of the rooms being serviced by the system. This capability can readily be provided by the damper 100 and damper operator 200 of the present invention by incorporating a volume control adjustment 250 into the damper operator structures previously described.

FIGS. 6–9 illustrate two alternative means for achieving such a result.

Figure 7:
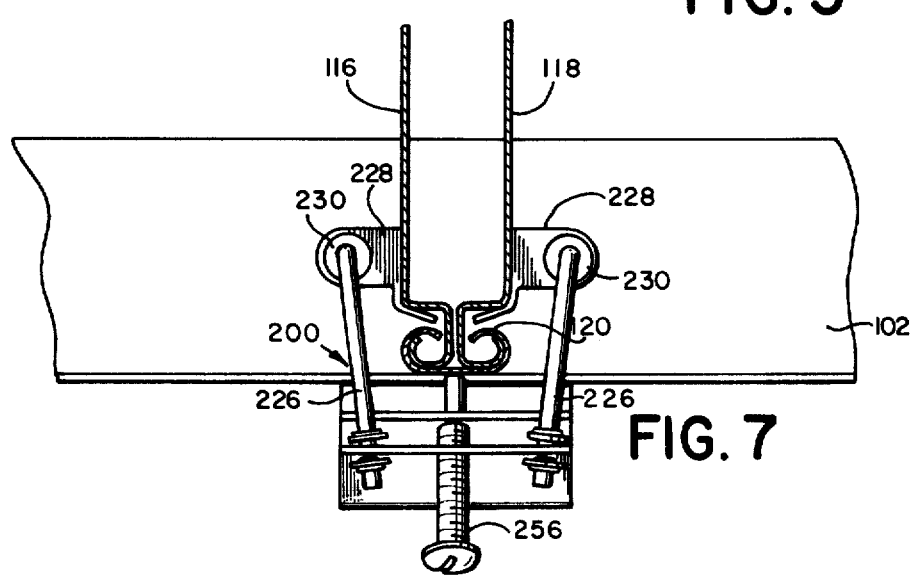
FIG. 7 is a fragmentary, cross-sectional view of the damper operator shown in FIG. 6.

In the first of these alternatives, shown in FIGS. 6 and 7, the damper operator 200 is provided with a rigid spacer bar 252 having an opening through which the lower portion 254 of a volume adjustment screw 256 can pass. The screw 256 also threadably engages the end portion 222 of the operator spring 202. The bottom end 258 of the screw 256 is positioned to rest directly against the cross-bar 120. As shown, the intermediate shoulder 260 of the screw 256 rests directly against the outer surface 263 of the spacer bar 252. As a result, control of the intermediate position attainable by the blades 116, 118 during operation is achieved by mearly turning the adjustment screw 256 clockwise or counter clockwise. Clockwise movement will pull the spring portion 202 and its associated links 226 outwardly along the shank of the screw 256, causing the damper blades 116, 118 to partially close, thereby setting an initial maximum air flow rate through the damper. Turning the screw 256 counter clockwise will permit the links 226 to move inwardly toward the cross-bar 120, increasing the maximum air flow rate achievable within the system branch with which the damper is associated. Continued operation of the damper blades 116, 118 from this intermediate position to a fully opened or closed position proceeds substantially as previously described.

In the second of these alternatives, shown in FIGS. 8 and 9, the links 226 are replaced by a fixed yoke 264 which is configured to bear against dimples 266 associated with the blades 116, 118 of the damper. In this manner, the blades can be operated under the influence of gravity, the yoke 264 acting as a control which rises and falls in response to movement of the spring element 202. In conjunction with relatively clean systems, in which large volumes of soot or smoke are not produced, such as in gas fired hot water heaters, such an approach offers distinctive opportunities for lowering costs without compromising system reliability. However, in most applications, it is generally desirable to apply a continuous tension against the blades 116, 118 to assure their free operation in the event that material accumulates within the hinge elements 314 of the cross-bar 120. In such cases, as shown in FIG. 9, a spring 268 can be provided for this purpose.

Figure 10:
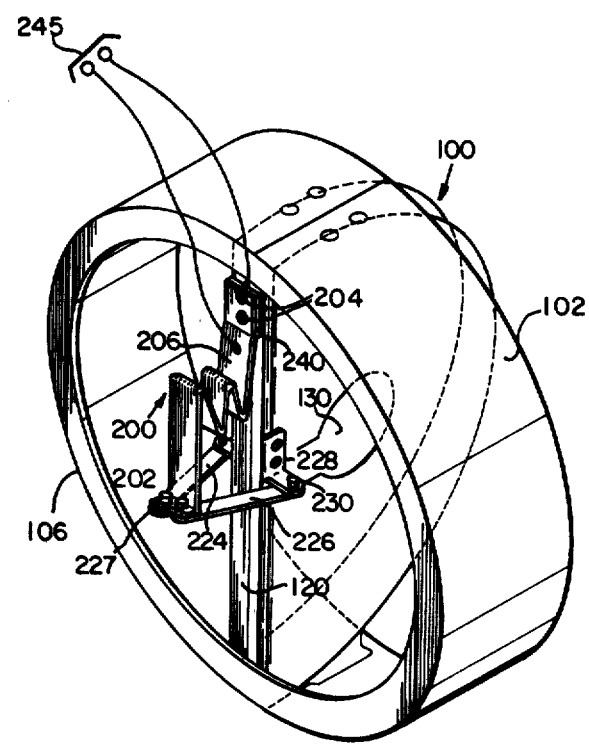
FIG. 10 is a perspective view of a damper and damper operator having additional means for permitting remote operation of the damper.

In some applications, it is desirable to provide the damper 100 and damper operator 200 with a capability for remote operation. This is readily accomplished by providing the damper operator 200 with a heating element 240 as illustrated in FIG. 10. The heating element 240 is placed adjacent the bimetallic spring element 202 so that, when operated, the heat produced by the element 240 serves to operate the element 202, and therefore the damper blades 116, 118 as previously described. Actuation of the heating element 240 may be accomplished, for example, by applying a current through the connection wires 245, which may be connected, as needed, to an appropriate control system, thereby providing a means for remotely controlling operation of the damper 100. Of course, other means may be used to heat and cool the element 202 if preferred. In fact, it may even be possible to apply a current directly to the ends of the element 202, so that the inherent resistivity of the material comprising the element 202 can produce the heat necessary to cause operation of the bimetallic element 202, and thus the damper operator 200.

Although the foregoing serves well to satisfy the objectives previously set forth, it will be understood that each of the damper operators previously described may be modified in order to meet a variety of operational conditions. For example, the size of the operator used can be altered as needed. So too can the number of bends which form the operator spring. As illustrated in FIGS. 1 and 3, the links 226 which join the element 202 to the blades 116, 118 may be flat bars, or if preferred, as illustrated in FIGS. 6 and 7, these links 226 may be bent rods which are retained to the element 202 and brackets 228 using a plurality of compression washers 231. Various other linkages may be used to achieve proper rotation of the blades 116, 118, if desired, in addition to those previously described. Other modifications are also possible.

It will therefore be understood that various changes in the details, materials and arrangement of the parts which have been herein described and illustrated in order to explain the nature of this invention, may be made by those skilled in the art within the principle and scope of the invention as expressed in the following claims.

What is claimed is:

1. For a damper having a frame and at least one reciprocal blade operatively associated therewith, an improved damper operator comprising:
   a. a bimetallic element, a portion of which is fixedly connected to the frame; and
   b. a link bar, pivotally connected to and between other portions of the bimetallic element and face portions of the blade of the damper;

so that reciprocating movement of the bimetallic element causes the blade to move within the damper frame.

2. The damper of claim 1 wherein the bimetallic element is a serpentine spring having a plurality of bends.

3. The damper of claim 1 wherein the bimetallic element is positioned within a duct housing the damper so that the bimetallic element faces a potential heat source.

4. The damper of claim 1 which further comprises means for maintaining the blade at a selected position intermediate a fully open and fully closed position.

5. The damper of claim 4 wherein the blade maintaining means is adjustable.

6. The damper of claim 1 wherein the damper comprises two reciprocal blades, each of which is connected to and pivotally associated with the bimetallic element by a separate linkage.

7. For a damper having a frame and two reciprocal blades operatively associated therewith, an improved damper operator comprising a bimetallic element pivotally connected to and between face portions of the blades of the damper.

8. For a damper having a frame and at least one reciprocal blade operatively associated therewith, an improved damper operator comprising:
   a. a bimetallic element connected to the frame;
   b. a linkage, connected between and pivotally associated with the bimetallic element and the blade of the damper; and
   c. an adjustable means for maintaining the blade at a selected position intermediate a fully open and fully closed position, comprising a threaded screw extending through portions of the bimetallic element and into contact with a cross-bar means attached to the damper frame;

so that extension or contraction of the bimetallic element causes the blade to move within the damper frame.

9. The damper of claim 8 wherein the adjustable blade maintaining means further comprises a yoke extending from the threaded screw toward the blade of the damper, and a dimple associated with the blade and in contact with portions of the yoke.

10. For a damper having a frame and a pair of reciprocal blades pivotally associated with a cross-bar attached to opposing portions of the frame, an improved damper operator comprising:

a. a bimetallic element, one portion of which is connected to the cross-bar; and b. a link, pivotally connected to and between a free end portion of the bimetallic element and face portions of each of the damper blades;

so that reciprocating movement of the bimetallic element causes the blades to move with respect to the cross-bar and within the damper frame.

11. The damper of claim 10 wherein reciprocating movement of the bimetallic element causes reciprocating movement of the link, thereby causing the blades to move with respect to the damper frame.

12. The damper of claim 1, 7 or 10 wherein the damper blade and operator are located within the damper frame.

13. The damper of claim 1, 7 or 10 wherein the damper operator is capable of remote operation.

14. The damper of claim 13 wherein the damper operator further comprises an electrically operated heating element attached to portions of the bimetallic element.

15. The damper of claim 1 wherein the link bar is directly connected to a free end portion of the bimetallic element.

* * * * *